Sept. 18, 1962  J. F. PRIBONIC  3,054,425
HEIGHT CONTROL VALVE
Filed Sept. 8, 1959
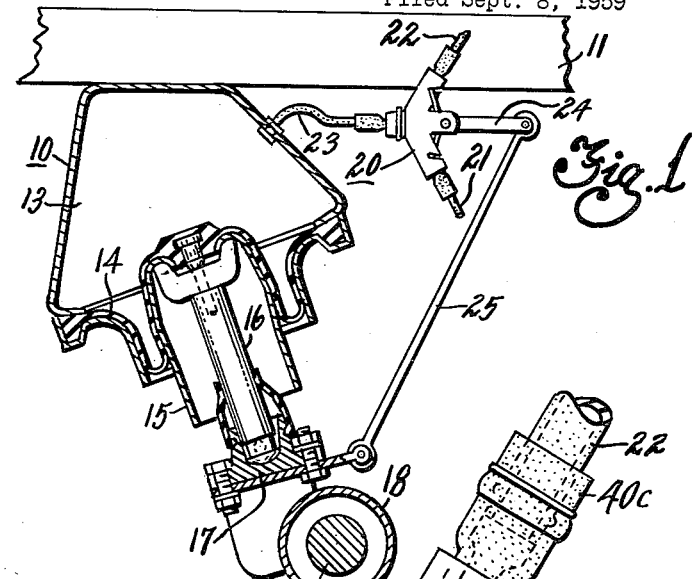
Fig. 1
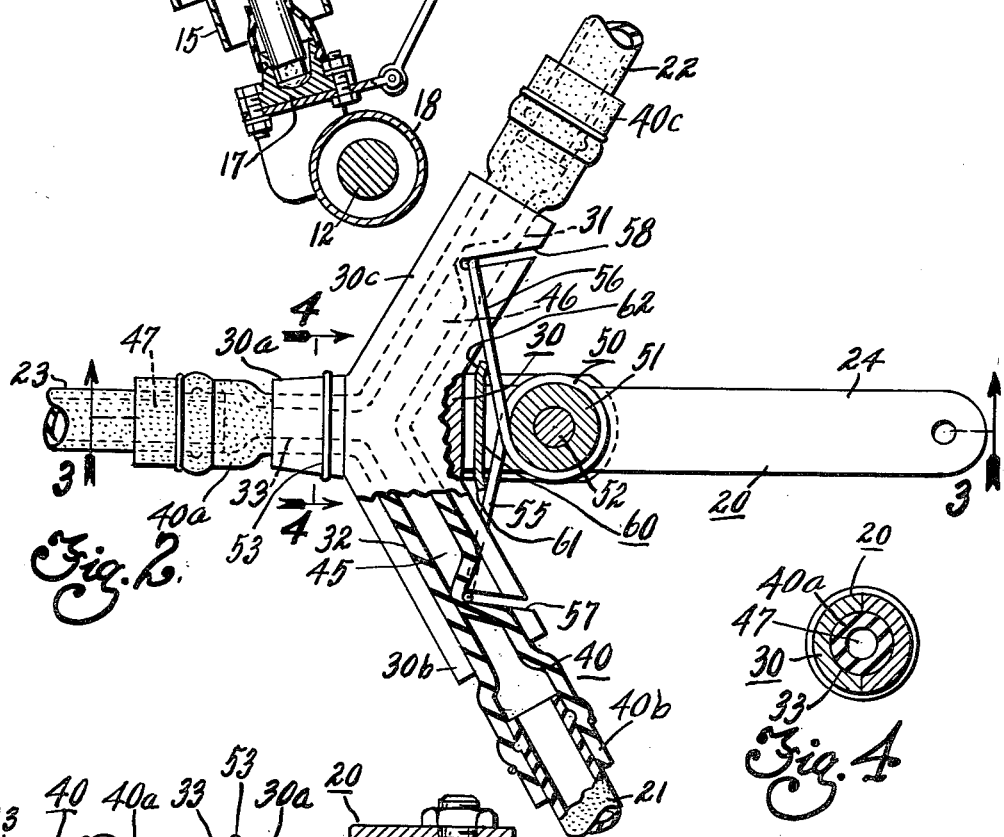
Fig. 2
Fig. 4
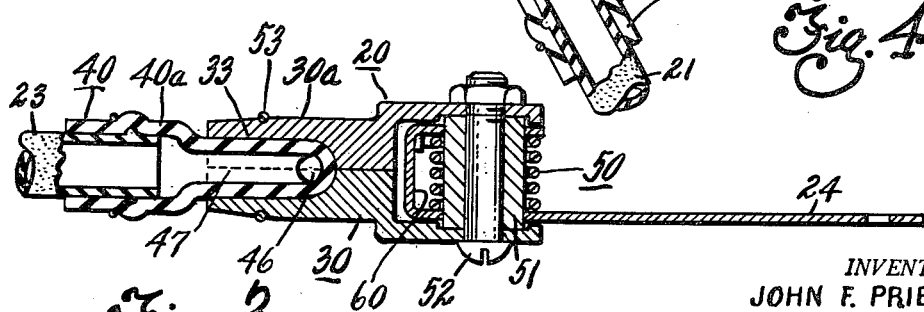
Fig. 3
INVENTOR.
JOHN F. PRIBONIC
BY
HIS ATTORNEY United States Patent Office 3,054,425
Patented Sept. 18, 1962

3,054,425
HEIGHT CONTROL VALVE
John F. Pribonic, Dayton, Ohio, assignor to General Motors Corporation, Detroit, Mich., a corporation of Delaware
Filed Sept. 8, 1959, Ser. No. 838,663
3 Claims. (Cl. 137—627.5)

This invention relates to fluid control valves adapted for controlling a pressure fluid flow to a fluid controlled device and exhaust of pressure fluid from the fluid controlled device. Specifically, the invention relates to a height control or leveling control valve adapted for use in connection with an air spring on a motor vehicle to maintain a relatively constant height relation between the sprung mass and the unsprung mass of the vehicle.

The use of air springs or pneumatic chambers between the sprung mass and the unsprung mass of a vehicle to support the sprung mass upon the unsprung mass is well known in the art. It is also well known in the art that a relative constant height relation can be maintained between the sprung mass and the unsprung mass of the vehicle by supplying an increase of air under pressure to the air spring when the load in the vehicle increases, air under pressure being exhausted from the air spring when the load in the vehicle decreases.

It is an object of this invention to provide a simplified fluid control valve for regulating the supply of fluid under pressure to the air spring and exhaust of fluid under pressure from the air spring to maintain a relative constant clearance height between the sprung mass and the unsprung mass of the vehicle.

Particularly, it is an object of the invention to provide a control valve that is structurally simple in design and manufacture to reduce cost of manufacture of the valve.

In accomplishing the foregoing object of the invention it is another object of the invention to provide a control valve that consists primarily of a valve body that has three fluid flow passages provided with a common interflow connection with one of the passages being adapted for connection with the device to be controlled, a second of the passages being adapted for connection with a source of fluid under pressure and the third passage being adapted for connection with exhaust, each of the passages having at least a portion of the passage formed of resilient material that can be collapsed to close the passage, the collapsed portion of the passage acting as a valve to close the passage against flow of fluid through the passage.

It is another object of the invention to provide a fluid control valve wherein the body of the valve consists primarily of three resilient tubular fluid flow passage means arranged with a common interflow connection and with at least two of the passage means being engaged by devices to effect collapsing of the passages to prevent flow of fluid therethrough, and wherein the devices that are adapted to collapse the passages are actuated by operating means to release the passages from their collapsed condition to allow for flow of fluid therethrough.

In accomplishing the foregoing objects, it is another object of the invention to structurally arrange the resilient passages in a manner that at least two of the resilient passages can be collapsed concurrently to prevent flow of high-pressure fluid to the device to be controlled or exhaust of fluid therefrom, the structure adapted for collapsing the passages being operating means arranged in a manner to release one or the other of the passages in providing for separate connection of the device to be controlled either with a source of fluid under pressure or with exhaust.

Further objects and advantages of the present invention will be apparent from the following description, reference being had to the accompanying drawings wherein preferred embodiments of the present invention are clearly shown.

In the drawings:

FIG. 1 is a somewhat schematic illustration of an air spring for a vehicle controlled by a valve constructed in accordance with this invention.

FIG. 2 is a cross-sectional view of the valve of this invention.

FIG. 3 is a cross-sectional view taken along line 3—3 of FIG. 2.

FIG. 4 is a cross-sectional view taken along line 4—4 of FIG. 2.

In this invention an air spring 10 is placed between the chassis 11 and the axle 12 of a vehicle to resiliently support the chassis relative to the axle.

The air spring 10 consists of a metal dome or chamber 13 closed at the bottom end by a diaphragm 14. The diaphragm 14 is supported at its mid section by a piston member 15 connected by the strut 16 with the support member 17 carried on the axle housing 18 that contains the axle 12. Thus, air under pressure in the chamber 13 resiliently supports the chassis 11 relative to the axle and axle housing.

The chassis 11 is maintained at a relatively constant clearance height relative to the axle housing 18 by regulating the pressure of the air within the chamber 13 under control of the fluid control valve 20. The fluid control valve 20 has an inlet connection 21 in fluid connection with a source of air under pressure carried on the vehicle. Such a source of pressure can be a compressor operated by the engine of the vehicle supplying a suitable reservoir from which the line 21 will be supplied. The control valve also has an outlet or exhaust line 22 through which air under pressure from the chamber 13 is exhausted under under control of the valve 20. The valve 20 is connected with the air chamber 13 of the air spring by means of the conduit 23 through which air under pressure flows into the air spring and through which air exhausts from the air spring.

The valve 20 is suitably secured to the chassis of the vehicle so that it moves with the chassis relative to the axle of the vehicle. The valve 20 has an operating arm 24 connected by means of a link 25 with the mounting member 17 and thereby with the axle housing to effect oscillation of the operating arm 24 on relative movement between the chassis and the axle of the vehicle.

From the foregoing description it will be apparent that upon a load increase in the vehicle, downward movement of the chassis 11 relative to the axle 12 will cause upward movement of the operating arm 24 to open the inlet line 21 and allow air under pressure to flow into the air spring 10 to offset the increase in load and re-establish a predetermined clearance height between the chassis and the axle of the vehicle. Conversely, decrease in load in the vehicle will cause the chassis to rise relative to the axle to result in opening of the exhaust line 22. This allows air under pressure to exhaust from the air spring 10 and return the chassis to the predetermined clearance height relative to the axle of the vehicle.

The valve 20 that regulates the flow of fluid under pressure into the air spring 10 and exhaust of fluid pressure from the air spring is more particularly illustrated in FIGS. 2 and 3.

The valve 20 consists of a rigid body structure 30 arranged generally in the form of a Y-shaped structure consisting of the stem portion 30a and the two leg portions 30b and 30c. The body 30 consists of two identical body halves split longitudinally along the axis of the body member as shown in FIG. 4.

The body 30 has a longitudinally extending chamber 31 provided in the leg portion 30c and a corresponding longitudinally extending portion 32 in the leg portion 30b, the two chamber portions being connected with a chamber portion 33 in the stem portion 30a. The chamber portions 31, 32 and 33 have therefore a common connection at the juncture between the stem 30a of the body and the two leg portions 30b and 30c. The chamber portions 31, 32 and 33 are preferably tubular in shape, as shown in FIG. 4, thereby forming longitudinally extending passages or chambers in the body.

The chamber portions 31, 32 and 33 of the valve body receive a second resilient body member 40 that is also in the form of a Y-shaped member whereby the stem portion 40a of the body 40 is received in the stem portion 30a of the body 30 and the leg portions 40b and 40c are received in the corresponding leg portions 30b and 30c of the rigid body 30.

Preferably, the stem portion 40a and the two leg portions 40b and 40c of the resilient body 40 are tubular in cross-sectional contour, as shown in FIG. 4, thereby forming fluid flow passages.

The stem portion 40a of the body 40 is connected with the conduit 23 and thereby, in turn, connected with the air spring 10 for supply of fluid under pressure to the air spring and exhaust of fluid under pressure therefrom. The leg portion 40b of the body 40 is connected with the fluid pressure source line 21 and the leg portion 40c is connected with the exhaust line 22.

The resilient tubular passage forming body portions 40b and 40c are adapted to be collapsed to close the passages 45 and 46 formed thereby, the closing of which passages prevents fluid flow to or from the air spring 10 to the passage 47 provided by the resilient body portion 40a.

To collapse the resilient tubular passage forming portions 40b and 40c of the body 40, a torsion spring 50 is carried on a sleeve 51 positioned between the two halves of the body 30, as shown in FIG. 3, a suitable bolt 52 retaining the two halves of the body 30 in assembled relationship at one side of the body. A snap ring 53 retains the body in assembled relationship at the stem portion thereof. Opposite ends 55 and 56 of the torsion spring 50 ride in slots 57 and 58 provided in the leg portions 30b and 30c of the body 30 and press against the resilient tubular passage forming body portions 40b and 40c of the body 40 to collapse the resilient tubular portions to close passages 45 and 46, as shown in FIG. 2. Thus, normally the torsion spring 50 retains the passages 45 and 46 closed concurrently.

To provide for regulation of air under pressure to the air spring and exhaust of air under pressure from the air spring, the operating arm 24 is pivotally mounted on the sleeve 51, as shown in FIG. 3. This arm being connected with a link 25 has already been described with reference to FIG. 1.

The operating arm 24 has a member 60 on the inner end thereof provided with the end portions 61 and 62 that can engage the ends 55 and 56 of the torsion spring 50 on oscillation of the operating arm 24 about the sleeve 51.

From the illustration in FIG. 2 it is obvious that upward movement of the arm 24 will cause the end 61 of the arm to engage the end 55 of the torsion spring 50 and thereby release engagement of the torsion spring end with the resilient tubular portion 40b to allow the resilience of the tubular portion to establish its normal diameter for flow of fluid under pressure to the air spring. Similarly, downward movement of the arm 24 will cause the end 62 thereof to engage the end 56 of the torsion spring 50 to relieve its pressure from the resilient tubular portion 40c and thereby allow fluid under pressure to exhaust through the passage 46.

The resilient body member 40 forming the three resilient tubular passage forming means 40a, 40b and 40c is preferably moulded from a rubber or rubber-like material or resilient plastic material as a single unit for insertion in the rigid body 30. Collapsing of the passage forming tubular portions 40b and 40c of the body 40 causes the resilient passage forming means to provide its own valve action, thereby eliminating the need of extra valves to control supply and exhaust of fluid to and from the air spring 10.

While the embodiments of the present invention as herein disclosed constitute a preferred form, it is to be understood that other forms might be adopted.

What is claimed is as follows:

1. In a fluid flow control valve, body means having three fluid flow passages having a common interflow connection with one of the passages in connection with a second of the passages for inflow of fluid to said one passage and in connection with the third of the passages for outflow of fluid from said one passage, at least said second and third passages each having a resilient portion collapsible to close the passage, resilient means comprising a torsion spring having opposite ends of the spring engaging respectively the said resilient portions of said second and third passages normally to collapse both of said portions concurrently, and independently acting means engaging said opposite ends of said spring separately to actuate the said opposite ends separately and release thereby the respective opposite ends of said spring from the respective resilient portions of said second and third passages separately for separate and independent fluid flow connection of said second and third passages with said one passage.

2. In a fluid flow control valve, body means having three fluid flow passages having a common interflow connection with one of the passages in connection with a second of the passages for inflow of fluid to said one passage and in connection with the third of the passages for outflow of fluid from said one passage, at least said second and third passages each having a resilient collapsible tubular portion to close the passage on collapsing of the said portion, resilient means comprising a torsion spring having opposite ends thereof engaging the respective tubular portions of said second and third passages and applying pressure thereon to collapse the said portions concurrently to close the same, and independently acting means engaging the respective opposite ends of said spring separately to actuate the respective opposite ends of said spring separately and release thereby the respective opposite ends of said spring from the respective tubular portions of said second and third passages separately for independent fluid flow connection of said second and third passages with said one passage.

3. In a fluid flow control valve, body means having three fluid flow passages having a common interflow connection with one of the passages in connection with a second of the passages for inflow of fluid to said one passage and in connection with the third of the passages for outflow of fluid from one said passage, resilient body means in an area of each of said second and third passages being collapsible to close the respective passage, rigid body means enclosing said resilient body means and having opening means therein adjacent each of the said areas, resilient means in the form of a torsion spring carried on said rigid body means and having opposite ends of the said spring extending into the respective opening means for the areas for the said second and third passages and engaging the respective areas normally collapsing both said areas to close said second and third passages concurrently, and independently acting means pivotally supported on said rigid body means separately acting on the said opposite ends of said spring to separately actuate the respective ends of the spring and release thereby each of said areas separately from the other to open the respective second or third passage for independent fluid flow connection thereto with said one passage.

References Cited in the file of this patent

UNITED STATES PATENTS

| | | |
|---|---|---|
| 2,841,178 | Schultz | July 1, 1948 |
| 2,857,172 | Jones | Oct. 21, 1958 |
| 2,908,508 | Brundson | Oct 13, 1959 |
| 2,985,192 | Taylor | May 23, 1961 |

FOREIGN PATENTS

| | | |
|---|---|---|
| 845,292 | Germany | 1952 |